(12) United States Patent
Hoeffner et al.

(10) Patent No.: US 11,122,241 B2
(45) Date of Patent: Sep. 14, 2021

(54) METHOD AND SYSTEM OF CONTROLLING ACCESS TO ACCESS POINTS

(71) Applicants: Daren Hoeffner, Suwanee, GA (US); Jeff Santeramo, Chester, GA (US); Robert McDaniel, Hoschton, GA (US)

(72) Inventors: Daren Hoeffner, Suwanee, GA (US); Jeff Santeramo, Chester, GA (US); Robert McDaniel, Hoschton, GA (US)

(73) Assignee: My Door View, LLC, Norcross, GA (US)

(*) Notice: Subject to any disclaimer, the term of this patent is extended or adjusted under 35 U.S.C. 154(b) by 0 days.

(21) Appl. No.: 15/107,551

(22) PCT Filed: Dec. 8, 2014

(86) PCT No.: PCT/US2014/069137
§ 371 (c)(1),
(2) Date: Jun. 23, 2016

(87) PCT Pub. No.: WO2015/099990
PCT Pub. Date: Jul. 2, 2015

(65) Prior Publication Data
US 2016/0316178 A1      Oct. 27, 2016

Related U.S. Application Data

(60) Provisional application No. 61/920,663, filed on Dec. 24, 2013.

(51) Int. Cl.
*H04N 7/18*      (2006.01)
*G07C 9/37*      (2020.01)
(Continued)

(52) U.S. Cl.
CPC ............... *H04N 7/186* (2013.01); *G07C 9/37* (2020.01); *H04N 7/183* (2013.01);
(Continued)

(58) Field of Classification Search
CPC .. H04N 7/186; H04N 21/4126; H04N 21/237; H04N 21/64322; H04N 7/183; G07C 9/00158
See application file for complete search history.

(56) References Cited

U.S. PATENT DOCUMENTS 4,760,393 A * 7/1988 Mauch ............... G07C 9/00571
340/5.54
6,317,489 B1 * 11/2001 Parsadayan .......... H04M 11/025
379/102.06

(Continued)

OTHER PUBLICATIONS

Linear Access, "Telephone Entry System User Instructions", 2007. Retrieved from https://www.linearproaccess.com/wp-content/uploads/AE-100_user.pdf (Refer to https://www.linearproaccess.com/access-controls/ae-100/ for further details).*

(Continued)

*Primary Examiner* — Richard A Hansell, Jr.
(74) *Attorney, Agent, or Firm* — Greenberg Traurig LLP; Nigamnarayan Acharya

(57) ABSTRACT

A method and system for controlling access to access points of an establishments are described. A call may be initiated from an access box to a smart device thereby activating the smart device to stream video via the Internet from an IP camera located at the access point. An end user of the smart device may communicate with and control access to the access point using the smart device.

18 Claims, 3 Drawing Sheets

(51) Int. Cl.
*H04N 21/237* (2011.01)
*H04N 21/41* (2011.01)
*H04N 21/643* (2011.01)

(52) U.S. Cl.
CPC ....... *H04N 21/237* (2013.01); *H04N 21/4126* (2013.01); *H04N 21/64322* (2013.01)

(56) References Cited

U.S. PATENT DOCUMENTS

| | | | | |
|---|---|---|---|---|
| 6,748,061 | B2* | 6/2004 | Ahlstrom | H04M 11/025 379/102.01 |
| 7,171,294 | B2* | 1/2007 | Kindo | G08G 1/0969 348/148 |
| 7,783,018 | B1* | 8/2010 | Goldberg | H04M 11/025 379/102.06 |
| 8,675,071 | B1* | 3/2014 | Slavin | G08B 25/001 348/156 |
| 8,780,201 | B1* | 7/2014 | Scalisi | H04N 7/186 348/143 |
| 9,003,196 | B2* | 4/2015 | Hoyos | G06F 21/34 713/186 |
| 2003/0018975 | A1* | 1/2003 | Stone | G08B 13/19693 725/105 |
| 2003/0081747 | A1* | 5/2003 | Ahlstrom | H04M 11/025 379/102.06 |
| 2003/0132830 | A1* | 7/2003 | Dow | H04N 7/186 340/5.22 |
| 2005/0232167 | A1* | 10/2005 | Gilbert | H04N 5/44591 370/260 |
| 2006/0089126 | A1* | 4/2006 | Frank | H04W 12/082 455/411 |
| 2010/0169943 | A1* | 7/2010 | Shannon | H04N 21/4223 725/106 |
| 2012/0068818 | A1* | 3/2012 | Mizon | G07C 9/20 340/5.61 |
| 2013/0017812 | A1* | 1/2013 | Foster | H04N 7/186 455/417 |
| 2013/0031611 | A1* | 1/2013 | Barreto | G06Q 10/06 726/4 |
| 2013/0057695 | A1* | 3/2013 | Huisking | H04N 7/186 348/156 |
| 2014/0266573 | A1* | 9/2014 | Sullivan | G07C 9/00571 340/4.32 |
| 2014/0361866 | A1* | 12/2014 | Evans | H04L 63/102 340/4.32 |
| 2015/0103165 | A1* | 4/2015 | Logvinov | H04N 7/181 348/143 |
| 2016/0248782 | A1* | 8/2016 | Troesch | H04L 63/108 |

OTHER PUBLICATIONS

Linear Access, "Telephone Entry System User Instructions", 2007. Retrieved from https://www.linearproaccess.com/wp-content/uploads/AE-100_user.pdf (Refer to https://www.linearproaccess.com/access-controls/ae-100/ for further details) (Year: 2007).*

AE-500 Telephone Entry & Access Control System Installation Instructions, Linear Corp. 2008 (see https://www.nortekcontrol.com/pdf/manuals/AE-500.pdf) (Year: 2008).*

N. Mediati "How to remotely install apps on your smartphone" PCWorld, Nov. 27, 2013. Retrieved from https://www.pcworld.com/article/2067005/how-to-remotely-install-apps-on-your-smartphone.html (Year: 2013).*

* cited by examiner

METHOD AND SYSTEM OF CONTROLLING ACCESS TO ACCESS POINTS

CROSS REFERENCE TO RELATED APPLICATION

This application is a U.S. national stage filing under 35 U.S.C. Section 371 of International Application No. PCT/US2014/069137, filed Dec. 8, 2014 and claims priority to U.S. Provisional Patent Application Ser. No. 61/920,663, filed Dec. 24, 2013, which is both incorporated by reference.

FIELD

The disclosure relates generally to building security and, more particularly, to methods and systems for controlling access to establishment access points.

BACKGROUND

Traditional security measures for buildings, including both residential and commercial, typically include an access request box located at an entry point into the building and an access granting box located within a section of the building. However, these traditional methods generally only provide for voice verification of the guest requesting entrance and the access granting box is typically statically located in a single area of the building. Thus, there is always a need for security systems and methods that allow for verification means other than or in conjunction with voice verification, as well as access granting apparatuses that do not need to be statically located at a single location.

SUMMARY

In an aspect of this disclosure, a method for controlling access to access points may include initiating a call by a guest through a first access box at a first access point, activating a smart device at a second position with the call, streaming video from an IP camera at the first access point to the smart device via the Internet, and allowing an end user at the second position to verify or communicate with the gust using the smart device. The end user may also unlock the first access point to allow the guest to proceed through the first access point. In an embodiment, the method may further include credentialing the end user. In yet another embodiment, the end user may having identifying information that is matched with a directory connected with the first access box. The first access box may have a phone number. According to multiple embodiments, the first access box may call the smart device and route calls to the smart device through a third party line.

In a further embodiment, an application on the smart device may be activated by caller identification information specific to the first access box. In yet another embodiment, a third party may enter the end user's identifying information into the directory connected with the first access box. According to an additional embodiment, the method may further include allowing the end user to download an application compatible with the smart device. According to an illustrative embodiment, the smart device may be connected to the IP camera via an accessed IP address via the Internet. In yet a further embodiment, the method may include initiating a call by the guest through a second access box and a third access box. The second and third access boxes may have respective second and third access points.

In an embodiment, the method may also include synchronizing an application on the smart device and a directory including the end user's identifying information via a code entered into the smart device. The code may incorporate credentialing information that connects the first access point and the smart device. In another embodiment, the smart device is a smartphone, computer, tablet, or set-top box. According to multiple embodiments the method may include assigning the IP camera to the first access box using, for example, the Internet. In further embodiments, the method may also include placing a second access box at a second access point and a third access box at a third access point.

In an embodiment, the first access box may be in communication with a phone line that has a phone number. According to various embodiments, the first access point may be at a border of a building, such as an office, house, apartment, loft, condominium, or townhouse, and the first access point may be at a border of a building, such as an elevator, gate, or door, for example. In another embodiment, an application on the smart device may identify the first access box from the phone number. In an additional embodiment, the method may further include launching an application on the smart device from the call from the first access box. In an illustrative embodiment, the video may be streamed worldwide. According to various embodiments, the end user may verify the guest by entering authorization information into the smart device and the smart device may receive a constant stream of video images from the IP camera, which is stored in a temporary memory. In an embodiment, the call from the first access box may activate an application on the smart device thereby causing the video to be displayed on the smart device's interface. In another embodiment, the first access box may identify the first access point by a telephone number connected to the first access point. In yet another embodiment, the video may be received by the smart device via a communication path, including the Internet.

In another aspect of the present disclosure, a system for controlling access to access points may comprise a first access box at a first access point at a first location that allows a call to be placed by a guest, an Internet access port from an IP camera to a smart device that acquires video data from the IP camera and allows communication between the smart device and the first access box, and an application on the smart device that enables the smart device to acquire video data from the IP camera upon receiving the call from the first access box. In an embodiment, the IP camera may comprise a camera and an encoder. In another embodiment, the smart device may be configured to identify the first location upon receipt of the call from the first access box. According to various embodiments, the Internet access port may comprise a wireless transceiver or a wired transceiver. In various embodiments, the system may further including a plurality of IP cameras and a plurality of access boxes. In yet another embodiment, the smart device may be a smartphone or set-top box.

Additional features and advantages of the present disclosure are described below. This disclosure may be readily utilized as a basis for modifying or designing other structures, systems, and processes for carrying out the same purposes of the present disclosure. It should also be realized by those skilled in the art that such equivalent implementations do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The particular features and advantages of this disclosure will be apparent from the detailed description set forth below in conjunction with the drawings in which like reference characters identify corresponding aspects throughout.

DETAILED DESCRIPTION

Figure 1A:
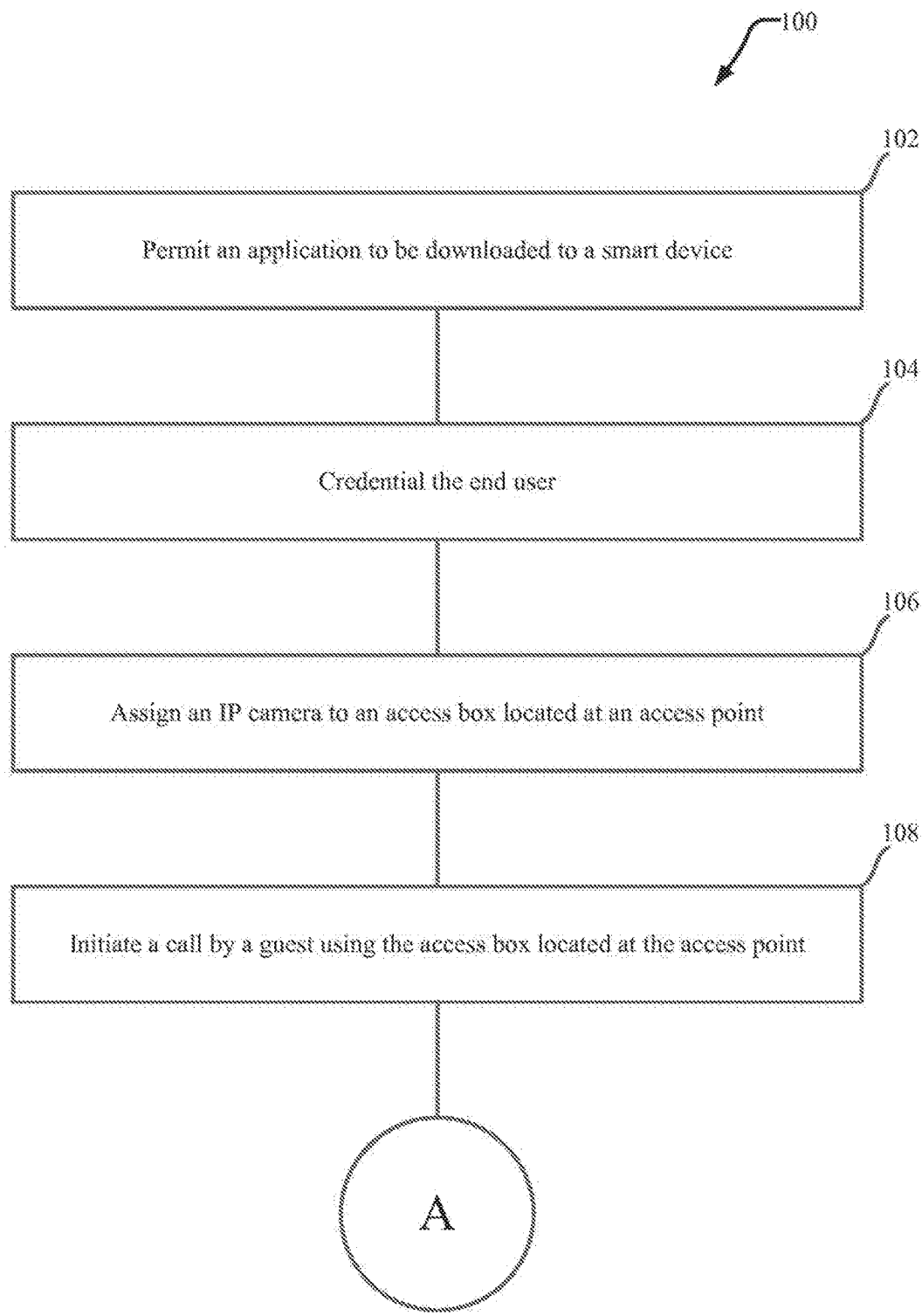
FIG. 1A is a process flow diagram illustrating a method for controlling access to access points according to aspects of the present disclosure.

The detailed description set forth herein makes reference to the accompanying drawings, which show various aspects of the present disclosure by way of illustration. While these various aspects are described in sufficient detail to enable those skilled in the art to practice the disclosure, it should be understood that other embodiments and implementations may be realized and that logical and mechanical changes may be made without departing from the scope of the disclosure. Thus, the detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment, for example.

According to aspects of the present disclosure, a smart device may have an application downloaded thereon that integrates IP-CCTV and Telephone Entry for visual telephone entry capabilities and end user control of at least one access point. For purposes of this disclosure, "smart device" may include a smart phone, tablet, personal computer, set-top box, or any other device having the properties and capable of performing the functions herein described. The application may be compatible with various platforms, such as Google Android, Apple OS, Apple iOS, and Windows, for example. The application may provide an end user with a live feed from a camera, such as an Internet Protocol (IP) camera, located at an access point of an establishment, for example. For purposes of this disclosure, "establishment" may include a commercial establishment such as an office, as well as a non-commercial establishment such as a single family or multi-family residence such as a house, apartment, loft, condominium, or townhouse, for example.

In embodiments where the smart device utilizes a Google Android operating system, the application may be a "listen-in" style that runs in the background of the smart device until the application is woken up to the foreground of the smart device upon receipt of an incoming telephone call from the access box. In embodiments where the smart device utilizes an Apple operating system, such as iOS or OS, use Voice Over Internet Protocol (VOIP) capabilities that result in the incoming call from the access box producing a push notification (or pop-up) on the smart device, which activates the application upon the end user accepting the incoming call.

According to multiple embodiments, regardless of the operating system that the smart device utilizes, the application may limit the end user to minimal or no substantive access to the application until the smart device receives a call from an access box. This can prevent stalkers or hackers from viewing an IP camera feed at an access point unnecessarily or without permission. One embodiment includes a communication network-based method of controlling access to access points, comprising: initiating a call by a guest through a first access box at a first access point; activating a smart device at a second position with the call; streaming video from an IP camera at the first access point to the smart device via the Internet; and allowing an end user at the second position to verify or communicate with the guest using the smart device, and optionally unlocking the first access point to allow the guest to proceed through the first access point Additionally, the IP camera's IP address may be hidden in the application to prevent unauthorized use from a personal computer.

Figure 1B:
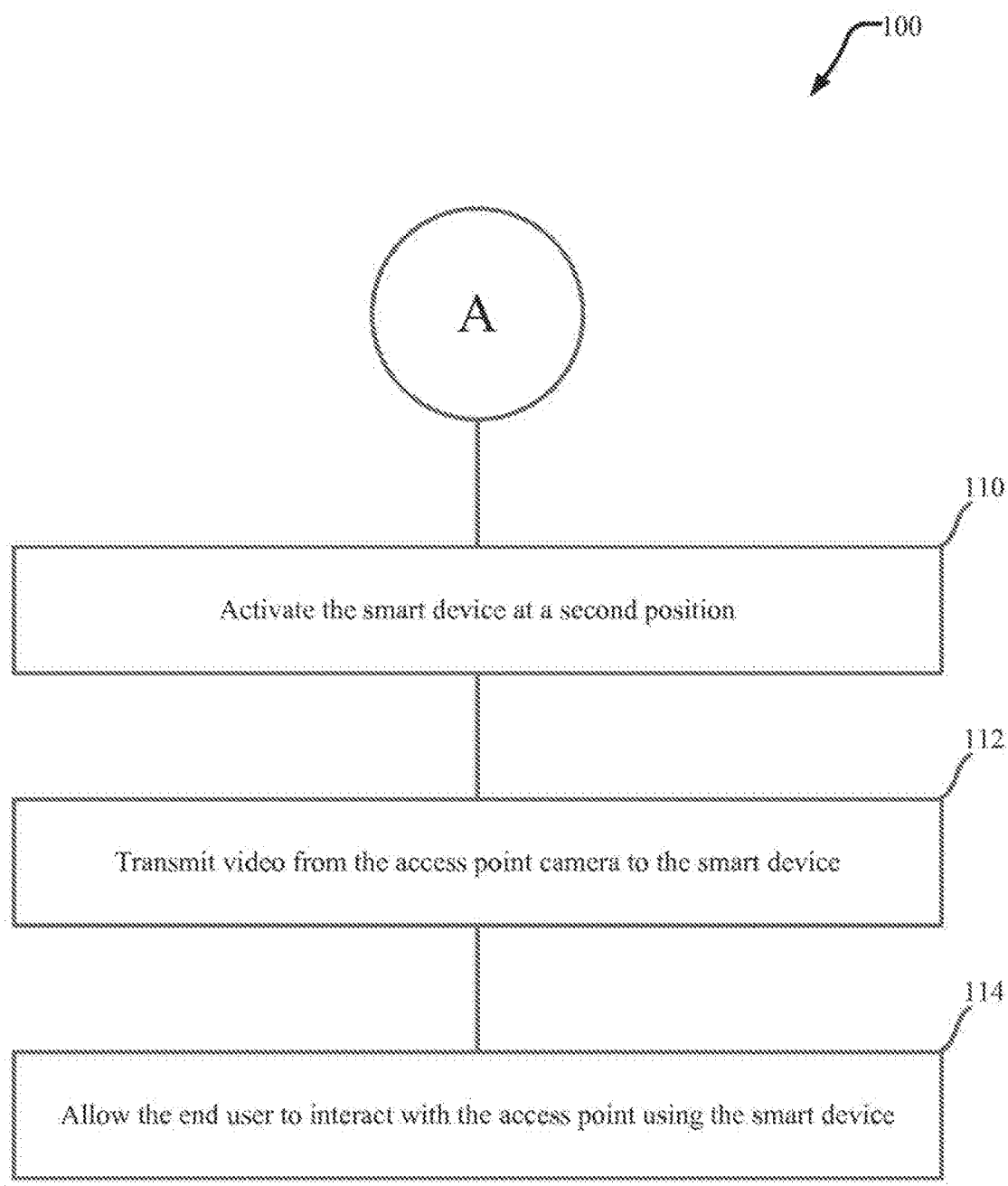
FIG. 1B is a process flow diagram illustrating a method for controlling access to access points according to aspects of the present disclosure.

According to an aspect of the present disclosure, a method 100 for controlling access to access points using a communication network is described with reference to FIGS. 1A and 1B. At block 102 an end user is permitted to download an application to a smart device. The smart device may include any operating system capable of downloading and using an application, such as Google Android, Apple iOS, Apple OS, and Windows, for example. The downloaded application may be synchronized to a database via a code entered into the smart device. In an embodiment, downloading of the application may require use of an establishment's web site that utilizes a username and password given to the end user from the establishment's staff to prevent unauthorized use of the application. In yet another embodiment, downloading of the application from a particular establishment's web site may be limited to one download per end user, or one download per smart device of the end user.

At block 104 the end user is credentialed (i.e., downloading of the application may require verification of various credentials). Accordingly, the application may be configured to lack functionality upon being downloaded by the end user. Credentialing the end user may include synchronizing/configuring the application to information contained in a credentialing authority/database. The credentialing authority/database may be a secure server and may include information specific to the establishment whose website the application was downloaded from, such as the establishment's name, an establishment photo thumbnail, telephone-entry system phone numbers(s) specific to each access point of the establishment, and IP address information for CCTV video feeds, for example. The telephone-entry system may have a single phone number used for every access box/point of the establishment or may have a single phone number used for each access box/point of the establishment. Further. The same IP address information may be used for each CCTV video feed at each access point or different IP address information may be used for each CCTV video feed at each access point. Credentialing of the end user may include submitting a password or code, specific to the establishment, to the credentialing authority. In an embodiment, a single password may be used synchronize the application with all of the access points of the establishment, or synchronization of each access point of the establishment may require a different password.

According to various embodiments, credentialing of the end user may include an establishment able to provision usage of the application using a one-time software license and a web-based administration and provisioning system. The provisioning system may enable establishments, resellers, and installation engineers to self-service a new establishment in the provision system by inputting a valid single-use license key, as well as configuration data for the unique establishment including, for example, establishment name, establishment thumbnail, establishment telephone-entry system phone number, and IP address information for CCTV video feeds. The self-service provisioning site may generate a unique establishment password code ID that the site communicates to the end users who download the application. The unique establishment password/code ID may unlock the actual tele-entry application functionality for that particular establishment.

At block 106 a camera, such as an Internet Protocol (IP) camera, may be assigned to an access box located at an access point. Such assignment of the IP camera to the access box may be performed using a variety of communications channels. Such as the Internet, for example. In an embodiment, a separate access box is placed at a separate access point and a separate IP camera may be assigned to the separate access box. It should be appreciated that an establishment may contain as many access boxes are there are access points, and also may contain as many IP cameras as there are access boxes. An access point may be located at a border of the establishment and may include, for example, an elevator, door, gate, or window. Further, it should also be appreciated that the establishment may be a commercial establishment such as an office, as well as a non-commercial establishment such as a single family or multi-family residence such as a house, apartment, loft, condominium, or townhouse, for example.

At block 108 a guest may initiate a call from an access box at an access point. In an embodiment, the access box may include one or more terminals, one of which includes identifying information about the end user, such as the end user's name, title, phone number, or address, for example. The one or more terminals may be linked to a directory/database that may include, for example, phone number that correspond to the terminal and its associated end user. In another embodiment, the access box calls an end user's smart device whose phone number is linked to the terminal that was accessed at the access box. In an embodiment, the access box may route the call to the end user's smart device using a third-party line.

In an embodiment, all of the access boxes of an establishment may use a single phone number when calling smart devices. According to another embodiment, each access box of an establishment may initiate a call to a smart device using a different phone number.

At block 110 the application on the smart device called by the access box of block 108 may be activated/launched upon receiving the call. Such activation may occur at a position distant from the location of the access box from which the guest is requesting entrance According to an embodiment, the application is activated the smart device receives caller identification information, such as a phone number, specific to an access box that was synched/credentialed at block 104. According to various embodiments, the application may run in the background on the smart device until an access box synchronized to the application calls the smart device. The application may recognize the phone number affiliated with the access box via a caller ID. Upon recognizing the phone number, the application may cause the smart device's interface to include "don't answer"and "answer" icons. Upon activating the "don't answer" icon, such as by physical contact with the smart device's interface, audio communication, or movement of the smart device, the application may immediately close and hibernate, thereafter running in the background of the smart device and rejecting the call from the access box (resulting In access to the establishment being denied). Upon activating the "answer" icon, such as by physical contact with the smart device's interface, audio communication, or movement of the smart device, the application may activate the smart device's speaker mode.

In conjunction with the smart device's speaker mode being activated, video is transmitted/streamed from the IP camera affiliated with the access box that called the smart device to the smart device, illustrated as block 112. In an embodiment, the smart device may be connected to the IP camera via an accessed IP address and may thereby receive the video via the Internet. In an embodiment, the video may be streamed across various geographic parameters such as statewide, countrywide, or worldwide, for example, depending on where the smart device is located in relation to the access box at the time the access box calls the smart device.

According to an embodiment, the smart device may receive a constant steam of video images from the IP camera and may store the images in a temporary memory located on the smart device or an external memory device. In a further embodiment, the smart device may only receive a video stream from an IP camera upon the access box affiliated with the IP camera calling the smart device. Additionally, along with the video stream, a logo for the establishment where the access point is located, as well as "answer"and "don't answer" icons may be displayed on the smart devices interface.

At block 114 the end user may interact, using the smart device, with the access box and/or access point where the guest is requesting entrance. Such interaction may include the end user verifying the and/or communicating with the guest. As illustration, the end user may communicate with the guest via two-way voice capabilities, such as microphones and speakers located in the smart device and access box, for example. In an embodiment, the end user may unlock the access point affiliated with the access box to allow the guest entrance into the establishment.

In an embodiment, the application may cause the smart device's interface to display "reject" and "unlock" icons while the video stream from the IP camera is displayed on the smart device's interface. Upon activating the "reject" icon, such as by physical contact with the smart device's interface, audio communication, or movement of the smart device, the application may immediately close and hibernate, thereafter running in the background of the smart device and rejecting the access to the establishment. Upon activating the "unlock" icon, such as by physical contact with the smart device's interface, audio communication, or movement of the smart device, a second "unlock"icon may appear in a different location on the smart device's interface to prevent accidental unlocking of the access point. Upon activating the second "unlock" icon, the application may transmit a signal, for example a DTMF9 signal, to unlock the access point. In an embodiment, unlocking of the access point may further include the end user entering authorization information into the smart device, such as an authorization code or password. Upon the signal being sent to the access point the application may automatically disconnect and hibernate, thereafter running in the background of the smart device.

Figure 2:
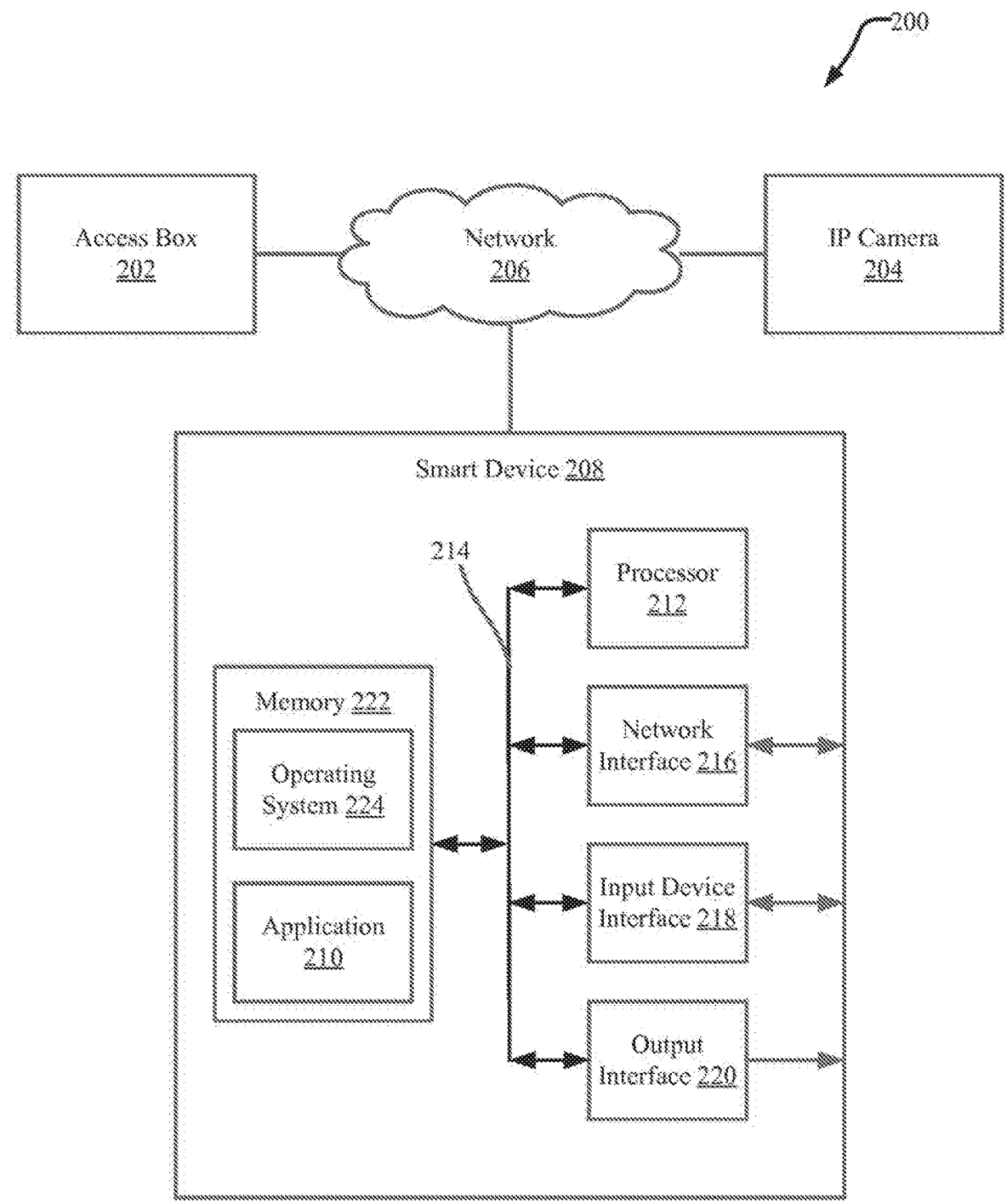
FIG. 2 is a conceptual block diagram illustrating a general example of a system for controlling access to access points according to aspects of the present disclosure.

According to another aspect of the present disclosure, a system 200 for controlling access to access points is described with reference to FIG. 2. The system 200 may include an access box 202, an IP camera 204, a network 206, a smart device 208, and an application 210.

The access box 202 may be located at an access point of an establishment and may be capable of allowing a guest to place a call to a smart device 208. The call may be communicated from the access box 202 to the smart device 208 through a network 206 such as, for example, the Internet. It should be appreciated that the system 200 may include multiple access boxes 202, each being located at a different access point of the establishment. Each access box 202 and corresponding access point may be located at a border of the establishment, such as an elevator, door, gate, or window. It should also be appreciated that an establishment may include a commercial establishment such as an office, as well as a non-commercial establishment such as a single family or multi-family residence such as a house, apartment, loft, condominium, or townhouse, for example.

The IP camera 204 may be located at the access box that is transmitting a call to the smart device 208. The IP camera 204 may comprise a camera and an encoder. Further, the IP camera 204 may be capable of gathering and streaming video from the access point affiliated with the access box. In an embodiment, the system 200 may include multiple IP cameras 204, each being located at a different access box of the establishment. According to another embodiment, multiple IP cameras 204 may be located at each access point of the establishment.

The network 206 may be in wireless or Bluetooth communication with the access box 202, the IP camera 204, and the smart device 208. In an embodiment, the network may be the Internet. In another embodiment, the network may contain a virtual Internet access port that links the IP camera 204 to the smart device 208. According to multiple embodiments, the virtual Internet port may include a wireless or wired transceiver.

The smart device 208 may be a device such as a small phone, tablet, personal computer, set-top box, or any other device having the properties and capable of performing the functions herein described. The smart device 208 may be configured to acquire video data from the IP camera 204 via the network 206. The smart device 208 may further be configured to transmit a first audio to the access box 202 and receive a second audio from the access box 202. In an embodiment, the smart device 208 may be configured to identify the access point where the guest is requesting entrance upon receipt of a call from the access box 202.

An illustrative smart device 208 may include a processor 212 in communication with a variety of other components over a system bus 214 or through a direct connection. These other components may include, by way of example, a network interface 216, an input device interface 218, an output interface 220, and a memory 222. As appreciated by those skilled in the art, the network interface 216 enables the smart device 208 to communicate data, control messages, data requests, and oilier information with other resources including computers, data sources, storage devices, the access box 202, the IP camera 204, and the like, on the network 206, such as the Internet. The network interface 216 may be configured to communicate via wired or wireless connections. As one skilled in the art will appreciate, the smart device 208 may obtain content, such as streamed audio and/or video from the access box 202 and/or the IP camera 204 via the network 206. The smart device 208 may also save the content to a networked location or send it to another device on the network 206, for example.

The input device interface 218, sometimes also embodied as an input-output interface, enables the smart device 208 to obtain data input from a variety of devices including, bin not limited to, a microphone, a digital pen, a touch screen, a keyboard, a mouse, a scanner, and the like. In addition to the exemplary components described above, an output interface 220 may be used for outputting information such as audio signals or display information. Audio signals may be output to other user devices, for example. Display information may be output by the output interface 220 via a display device (e.g., a monitor or similar device, not shown), for example. Audio output may also be output by the output interface 220 through an audio device such as a speaker, for example. An audio input device, such as a microphone, may also input audio to the smart device 208. Of course, while not shown, one skilled in the art will appreciate that one or more speakers and/or audio input devices, may be incorporated as integral elements within a smart device 208 or may be separate therefrom.

The processor 212 may be configured to operate in accordance with programming instructions stored in a memory 222. The memory 222 generally comprises RAM, ROM. and/or other memory. Thus, in addition to storage in read/write memory (RAM), programming instructions may also be embodied in read-only format, such as those found in ROM or other permanent memory. The memory 222 may store an operating system 224 for controlling the operation of the smart device 208. The operating system 224 may be a general purpose operating system such as a Microsoft Windows operating system, a UNIX operating system, a Linux operating system, a Google Android operating system, an Apple OS operating system, an Apple iOS operating system, or an operating system specifically written for and tailored to the smart device 208. Similarly, the memory 222 may also store user-executable applications 210, or programs, for conducting various functions on the smart device 208. For example, the application 210 in the memory 222 may be configured according to aspects of the present disclosure to control access to access points.

The application 210 may be located on the smart device 208. The application 210 may be compatible with various platforms, such as Google Android, Apple iOS, Apple OS, and Windows, for example. Additionally, the application 210 may enable the smart device 208 to acquire video from the IP camera 204 upon a call being initiated from the access box 202. According to various embodiments, the end user, by using the application 210, may view the entrance requestor via the IP camera 204 video feed. The application 210 may also enable the end user to activate an on-screen icon to answer the call initiated from the access box 202, as well as speak to the guest requesting entrance. If the end user accepts the request for entrance, the end user may activate an on-screen "unlock" icon that transmits a signal, for example a DTMF9 signal, to unlock the access point.

Embodiments of the present disclosure are described herein with reference to the accompanying drawings. However, the present disclosure should not be construed as limited to the embodiments set forth herein. Rather, these embodiments are provided so that this disclosure will be thorough and complete, and will fully convey the scope of the present disclosure to those skilled in the art. Like numbers refer to like elements throughout. As used herein, the term "and/or" includes any and all combinations of one or more of the associated listed items and may be abbreviated as "/".

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "having," "includes," "including," and/or variations thereof, when used in this specification, specify the presence of stated features, steps, operations, elements, and/or components, but do not preclude the presence or addition of one or more other features, steps, operations, elements, components, and/or groups thereof.

It should be understood that when an element is referred to as being "connected"or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present.

It will be understood that, although the terms first, second, etc. may be used herein to describe various elements and/or components, these elements and/or components should not be limited by these terms. These terms are only used to distinguish one element and/or component from another element and/or component. Thus, a first element or component discussed below could be termed a second element or component without departing from the teaching of the present disclosure.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although the present disclosure has been described in connection with the embodiments of the present disclosure illustrated in the accompanying drawings, it is not limited thereto. The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although specific components have been set forth, it will be appreciated by those skilled in the art that not all of the disclosed components are required to practice the disclosed configurations. Moreover, certain well known components have not be described, to maintain focus on the disclosure.

For firmware and/or software implementation, the methodologies may be implemented with modules (e.g., procedures, functions, and so on) that perform the functions described herein. A machine-readable medium tangibly embodying instructions may be used in imptementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disc storage, magnetic disk storage or other magnetic storage devices, or other medium that can be used to store desired program code in the form of instructions or data structures and that can be accessed by a computer. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative or instructions and data. The instructions and data are configured to cause one or more processors to implement the functions outlined in the claims.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps presently existing or later to be developed that perform substantially the same functions or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A communication network-based method of controlling access to access points at a multi-family structure, comprising:
    credentialing, by an application executed on a smart device, a specific end user from a plurality of end users based on authentication information specific to the end user and the multi-family structure;
    synchronizing the application on the smart device and a directory that is linked to the access points and includes identifying information based on a code entered into the smart device, the code incorporating credentialing information that connects a first access point and the smart device;

initiating a call by a guest through a first access box at a first access point at the multi-family structure, wherein the first access box can open and close the access point, and wherein the first access box connects to a specific end user at a first position among the plurality of end users;

receiving, from a guest and by the first access box, identifying information associated with the specific end user to identify the specific end user from the plurality of end users;

responsive to the call initiation, activating the smart device associated with the specific end user that previously authenticated;

streaming video from an IP camera at the first access point to the smart device via the Internet; and allowing the specific end user at the first position to verify or communicate with the guest using the smart device;

wherein the call has the identifying information previously credentialed to the smart device, and wherein the application on the smart device activates upon the smart device receiving the identifying information, and wherein the application is activated by caller identification information specific to the first access box having a phone number that identifies the first access box to the smart device; and providing access to the guest by the specific end user and the first access box via the first access point.

2. The method of controlling access to access points at a multi-family structure of claim 1, wherein the first access box calls the smart device.

3. The method of controlling access to access points at a multi-family structure of claim 1, wherein the first access box routes calls to the smart device through a third-party communication line.

4. The method of controlling access to access points at a multi-family structure of claim 1, wherein the application on the smart device is activated by caller identification information specific to the first access box.

5. The method of controlling access to access points at a multi-family structure of claim 1, wherein an identifier affiliated with the call that is recognized by the smart device to cause an application on the smart device to be activated, and whereby the application allows the smart device to communicate with the first access box.

6. The method of controlling access to access points at a multi-family structure of claim 5, further comprising: allowing the end user to download a tele-entry application compatible with the smart device based on the authentication information.

7. The of controlling access to access points at a multi-family structure of claim 6, wherein the smart device is connected to the IP camera via an accessed IP address via the Internet.

8. The method of controlling access to access points at a multi-family structure of claim 1, wherein the smart device is one of a smartphone, a computer, a tablet, or a set-top box.

9. The method of controlling access to access points at a multi-family structure of claim 1, further comprising the step of: assigning the IP camera to the first access box.

10. The method of controlling access to access points at a multi-family structure of claim 5, further comprising the step of: placing a second access box at a second access point.

11. The method of controlling access to access points at a multi-family structure of claim 1, wherein the first access point is at a border of a building, the building being one of an office, a house, an apartment, a loft, a condominium, or a townhouse.

12. The method of controlling access to access points at a multi-family structure of claim 11, wherein the first access point is at a border of a building, the border being one of an elevator, a gate, or a door.

13. The method of controlling access to access points at a multi-family structure of claim 1, wherein an application on the smart device identifies the first access box from the phone number.

14. A communication network-based method of controlling access to access points at a multi-family structure, comprising:

credentialing, by an application executed on a smart device, a specific end user from a plurality of end users based on authentication information specific to the end user and the multi-family structure;

synchronizing the application on the smart device and a directory that is linked to the access points and includes identifying information based on a code entered into the smart device, the code incorporating credentialing information that connects a first access point and the smart device;

initiating a call by a guest through a first access box at the first access point, wherein the first access box can connect to the specific end user among the plurality of end users using identifying information, wherein the guest enters the identifying information into the first access box to identify the specific end user from the plurality of end users;

activating a smart device associated with the specific end user based on the guest entering the identifying information, wherein the smart device is incapable of establishing communication with the first access box prior to receiving the call;

streaming video from an internet protocol (IP) camera at the first access point to the smart device via the Internet; and launching an application on the smart device in response to the call from the first access box and displaying the streamed video on the smart device, wherein the call can be answered by the specific end user after viewing the video and the specific end user allows access to the first access point.

15. The method of controlling access to access points at a multi-family structure of claim 11, wherein the first access box identifies the first access point by a telephone number connected to the first access point.

16. A communication network-based system for controlling access to access points to a multi-family structure, comprising:

a first access box capable of (a) allowing a call to be placed by a guest to a specific end user from a plurality of end users using identifying information, (b) allowing a guest to enter the identifying information into the first access box, (c) identifying the specific end user from the plurality of end users by matching the identifying information with stored identifying information associated with the specific end user, and (d) controlling access to the multi-family structure, wherein the first access box is at a first access point at a first location;

an internet protocol (IP) camera is in communication with the first access box;

an Internet access port from the IP camera to a smart device, wherein the smart device is associated with a specific end user;

the smart device configured to acquire video data from the IP camera and to allow communication between the smart device and the first access box, and wherein the smart device is configured to receive credentials, by an application executed on the smart device, for the specific end user from the plurality of end users based on authentication information specific to the end user and the multi-family structure;

the smart device configured to synchronize the application on the smart device and a directory that is linked to the access points and includes identifying information based on a code entered into the smart device, the code incorporating credentialing information that connects the first access point and the smart device;

a plurality of access boxes;

the application on the smart device that enables the smart device to acquire video data from the IP camera upon receiving the call from the first access box; and the IP camera comprises a camera and encoder; and the smart device is configured to identify the first location upon receipt of the call from the first access box.

17. The system according to claim 16, wherein the Internet access port comprises a wireless transceiver.

18. The system of claim 16, further comprising: a plurality of IP cameras.

* * * * *